(12) United States Patent
Behm

(10) Patent No.: US 8,112,211 B2
(45) Date of Patent: Feb. 7, 2012

(54) METHOD AND DEVICE FOR HYDROSTATICALLY BRAKING A VEHICLE

(75) Inventor: Martin Behm, Ulm (DE)

(73) Assignee: Bosch Rexroth AG, Stuttgart (DE)

( * ) Notice: Subject to any disclaimer, the term of this patent is extended or adjusted under 35 U.S.C. 154(b) by 864 days.

(21) Appl. No.: 12/097,724

(22) PCT Filed: Dec. 15, 2006

(86) PCT No.: PCT/EP2006/012125
§ 371 (c)(1),
(2), (4) Date: Jun. 16, 2008

(87) PCT Pub. No.: WO2007/073891
PCT Pub. Date: Jul. 5, 2007

(65) Prior Publication Data
US 2008/0262688 A1    Oct. 23, 2008

(30) Foreign Application Priority Data
Dec. 16, 2005   (DE) .......................... 10 2005 060 340

(51) Int. Cl.
*B62D 5/06* (2006.01)
(52) U.S. Cl. ......................................................... 701/70
(58) Field of Classification Search ...................... 701/70
See application file for complete search history.

(56) References Cited

U.S. PATENT DOCUMENTS

| | | | | |
|---|---|---|---|---|
| 5,683,322 A * | 11/1997 | Meyerle | ........................... | 475/72 |
| 5,890,982 A * | 4/1999 | Meyerle | ........................... | 475/72 |
| 6,766,236 B1 * | 7/2004 | Lamela et al. | ................... | 701/50 |
| 7,273,125 B2 * | 9/2007 | Schuh | ............................ | 180/305 |
| 7,464,785 B2 * | 12/2008 | Spark | ............................. | 180/236 |
| 7,857,085 B2 * | 12/2010 | Spark | ............................. | 180/236 |
| 2005/0217906 A1 * | 10/2005 | Spark | ............................. | 180/22 |
| 2009/0159356 A1 * | 6/2009 | Spark | ............................. | 180/333 |
| 2009/0204292 A1 * | 8/2009 | Tate et al. | ....................... | 701/41 |

FOREIGN PATENT DOCUMENTS

| | | |
|---|---|---|
| EP | 0 653 324 A1 | 5/1993 |
| EP | 0 599 263 A2 | 6/1994 |
| EP | 196 38 421 A1 | 3/1997 |
| EP | 1 431 098 A1 | 6/2004 |

* cited by examiner

*Primary Examiner* — Joanne Silbermann
*Assistant Examiner* — Michael Stabley
(74) *Attorney, Agent, or Firm* — Scully, Scott, Murphy & Presser, P.C.

(57) ABSTRACT

A method and device for controlled braking of a vehicle using a hydrostatic drive is provided. Two pivotal hydraulic motors are connected to a respective axle of the drive, driven by a hydraulic pump and regulated by a respective regulating circuit. For each axle of the drive, a respective reference variable containing the difference between a set value and the actual value of a speed of the driven wheel is continuously determined and fed back to the respective regulating circuit. A displacement of the axle load of the vehicle from a current deceleration (a) of the vehicle is dynamically determined. A resultant braking force acting on the axle driven by the hydraulic motor is determined and put into effect by the hydraulic motor through adjusting a corresponding pivot angle. A deceleration-dependent distribution of the braking force is then provided to the respective axle by a control program.

16 Claims, 3 Drawing Sheets

METHOD AND DEVICE FOR HYDROSTATICALLY BRAKING A VEHICLE

BACKGROUND

The invention relates to a device and a method for controlled braking of a vehicle having a hydrostatic drive mechanism.

DE 196 38 421 A1 discloses a traction control system whereof the use is provided as a control of a hydraulically driven vehicle having a front and a rear drive unit. This traction control system has, for each drive unit, a hydraulic motor connected to the latter and having variable displacement, the hydraulic motors being connected in parallel to a pump. Provided in the traction control system is a central control system which detects parameters such as the speed, the direction of movement and the inclination in relation to the surface of the ground and processes them further such that they are used to activate the hydraulic motors of the front and rear drive units, such that when slip occurs at an axle, the hydraulic motor of the axle concerned is adjusted accordingly.

A disadvantage of the traction control system described in DE 196 38 421 A1 consists in the fact that even though the throughput through a hydraulic motor may change the quantity conveyed by the pump remains constant. This means that a reduction in the throughput through the hydraulic motor may bring about an increase in pressure in the lines of the hydraulic circuit, with these lines and in particular their connection points being overloaded. An increase in the throughput, by contrast, has the effect of a drop in pressure in the lines of the hydraulic circuit, with there again being a risk of mechanical damage to the lines because of the possibility of cavitation occurring. Moreover, no account is taken of the dynamic braking behaviour.

The object of the present invention is to provide an improved method and an improved device for braking a vehicle which also takes account of the dynamics of performing braking.

SUMMARY

The method according to the invention and the device according to the invention for controlled braking of a vehicle having a hydrostatic drive mechanism take as their starting point the fact that the hydrostatic drive mechanism has at least two pivotal hydraulic motors which are connected to a respective axle of the drive mechanism and are driven by a hydraulic pump and regulated by a respective regulating circuit. Regulation of the hydraulic motors serves to prevent wheels on the vehicle from locking, in that the regulation continuously determines, for each axle or for each wheel of the drive mechanism, a respective reference variable comprising the difference between a set value and the actual value of a speed of the driven wheel, and feeds this reference variable back to the respective regulating circuit. In order to provide deceleration-dependent distribution of the braking force to the respective axle by a control program, a displacement of the axle load of the vehicle is dynamically determined from the current deceleration of the vehicle and a resultant braking force acting on the axle driven by the hydraulic motor is determined. The resultant braking force is put into effect by way of the hydraulic motor associated with the respective axle by adjusting a pivot angle of the corresponding hydraulic motor or motors.

Preferably, the current deceleration is determined when the brakes are actuated throughout the braking procedure by determining the difference between a current linear velocity of the vehicle and the ground underneath.

Furthermore, it is advantageous if the current deceleration is multiplied by a geometric factor calculated from the relationship between the height of the vehicle centre of gravity and the spacing between the axles to determine dynamically the displacement of the axle load throughout the braking procedure. Advantageously, the method according to the invention may be used after adapting the geometric factor to different types of vehicles.

A further advantage of the method according to the invention and the device according to the invention consists in the resultant braking force to the front axle differing from the resultant braking force to the rear axle by twice the amount of the displacement of the axle load. The resultant braking force to the axle which is at the front, as seen in the direction of travel, is produced by adding a predetermined braking force to the displacement of the axle load, whereas the resultant braking force to the rear axle is produced by subtracting the displacement of the axle load from the predetermined braking force. Advantageously, for this the pivot angle of the hydraulic motor on the front axle is increased such that a braking force which has been increased by the displacement of the axle load is exerted on the ground underneath. The pivot angle of the hydraulic motor on the rear axle is reduced such that the wheels of the rear axle transmit less braking force to the ground underneath. Advantageously, the deceleration-dependent distribution of braking force prevents locking of the wheels at the rear axle and hence the vehicle breaking out of control on braking. Improved behaviour under braking may be produced by this without additional expense for components.

It is furthermore advantageous for the hydraulic pump driving the hydraulic motors itself to be integrated in a regulating circuit. This means that the conveying volume of the hydraulic pump can be dynamically adapted to the throughput of the adjustable hydraulic motors.

Further, it is advantageous for the method according to the invention and the device according to the invention to be capable of being applied both to each vehicle axle and to each wheel.

BRIEF DESCRIPTION OF THE DRAWINGS

A preferred embodiment of the device according to the invention for controlled braking of a hydrostatic drive mechanism is illustrated in the drawing and explained in more detail in the description below. In the drawing.

DETAILED DESCRIPTION OF EXEMPLARY EMBODIMENTS

Figure 1:
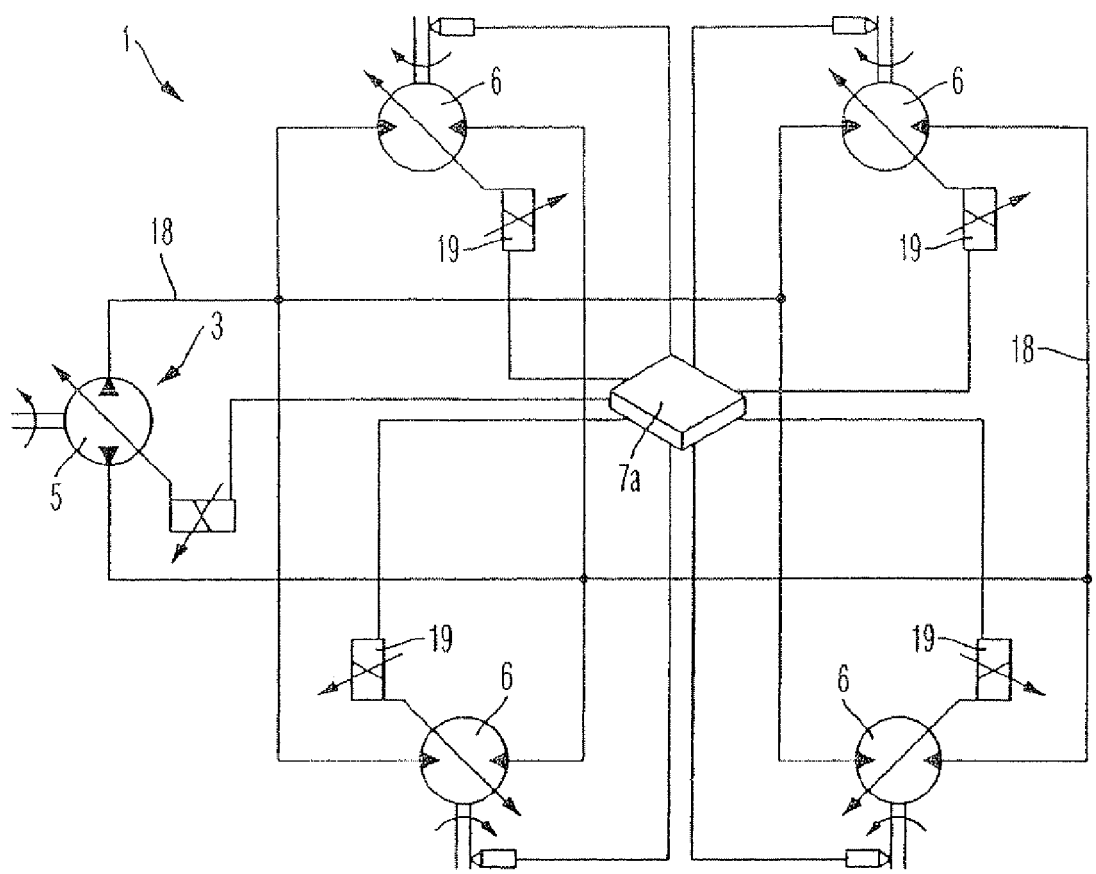
FIG. 1 shows a diagrammatic illustration of the device according to the invention.

FIG. 1 shows a diagrammatic illustration of the device 1 according to the invention for controlled braking of a vehicle 2 having a hydrostatic drive mechanism 3 which has a closed hydraulic circuit 18. In this illustration, the hydrostatic drive mechanism 3 has four pivotal hydraulic motors 6 which are driven by a hydraulic pump 5, in each case two hydraulic motors 6 being connected to a respective axle 4 of the drive mechanism 3, or each hydraulic motor 6 driving one vehicle wheel.

The device 1 according to the invention has a regulating device 7a for continuous feedback to the regulating device 7a of a reference variable F comprising the difference between a set value and the actual value of a speed of the driven wheel 17. For this purpose, a respective speed sensor is mounted on the wheels of the hydrostatic drive mechanism 3, and this detects the current speed of the wheel 17 and passes it on to the regulating device 7a for further evaluation.

The regulating device 7a activates an anti-lock system for providing a distribution of the braking force $F_{Br,v}$, $F_{Br,h}$ to the axles 4 of the drive mechanism 3 in that those wheels 17 which rotate at a lower speed than the other wheels of the drive mechanism 3 are detected and are braked in dependence on a regulating variable R determined dynamically from the reference variable F in that the throughput of the corresponding hydraulic motor 6 is reduced accordingly.

In a control program of the regulating device 7a, displacement of the axle load ΔF of the vehicle 2 is determined dynamically from the current deceleration a of the vehicle 2, with a resultant braking force $F_{Br,v}$, $F_{Br,h}$ on the axle 4a, 4b which is driven by the hydraulic motor 6 being determined and being put into effect by adjusting a pivot angle, by way of the hydraulic motor 6, which is associated with the respective axle 4a, 4b and pivotal to zero.

The hydraulic motors 6 and the hydraulic pump 5 of the device 1 according to the invention each have an actuator 19 which is activated in a manner proportional to the current, and which receives the regulating variable determined by the regulating device 7a and passes it on to the hydraulic motor 6 or hydraulic pump 5, with the result that the new operating parameters such as throughput and pivot angle can be set from it. In a further exemplary embodiment, the actuator 19 may also be arranged such that its signal acts simultaneously on two hydraulic motors 6 on one axle 4. As a result, in each case two hydraulic motors 6 on a drive axle 4a, 4b have a common actuator 19 activated in a manner proportional to the current.

Figure 2:
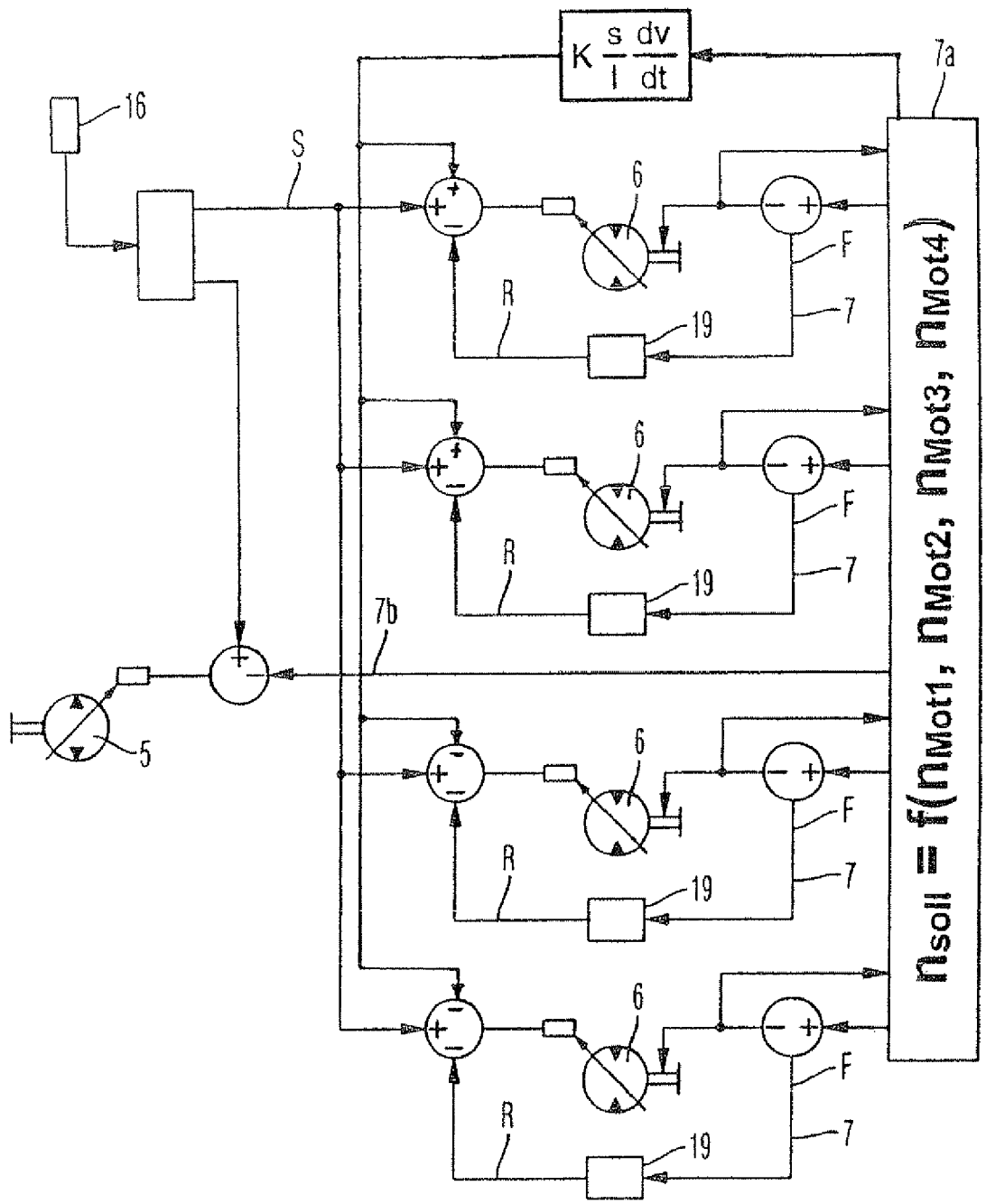
FIG. 2 shows a diagrammatic illustration of the regulating circuit of the device according to the invention.

FIG. 2 shows a diagrammatic illustration of the regulating circuit 7 of the device 1 according to the invention. The hydraulic pump 5 is pivoted by means of a control unit 16 to a deflection great enough for the hydraulic fluid to flow in the hydraulic circuit 18 and to drive the four hydraulic motors 6. In addition, the control unit 16 predetermines the pivot angle of the hydraulic motors 6, with the result that it is ensured that the pivot angle of the hydraulic motors 6 is sufficient for enough hydraulic fluid to flow through the hydraulic motors 6 and for these to transmit the braking force necessary for the drive mechanism to ground 20 underneath.

Connected to the hydraulic motors 6 and the hydraulic pump 5 is a regulating device 7a which determines, from the current difference between a dynamically determined actual speed and a set speed, fixed in the regulating device 7a, of the respective hydraulic motor 6, a reference variable F from which a regulating variable R is derived and acts on the pivot angle of the respective hydraulic motor 6, with this regulating variable being added to an externally predetermined control variable S and acting on the respective hydraulic motor 6 such that the pivot angle is altered accordingly. An addition of the predetermined control variable S and the determined regulating variable R also acts on the hydraulic pump 6, with the result that its operating parameter is not only predetermined by way of the control unit but is also influenced by the dynamically determined regulating variable R.

Figure 3:
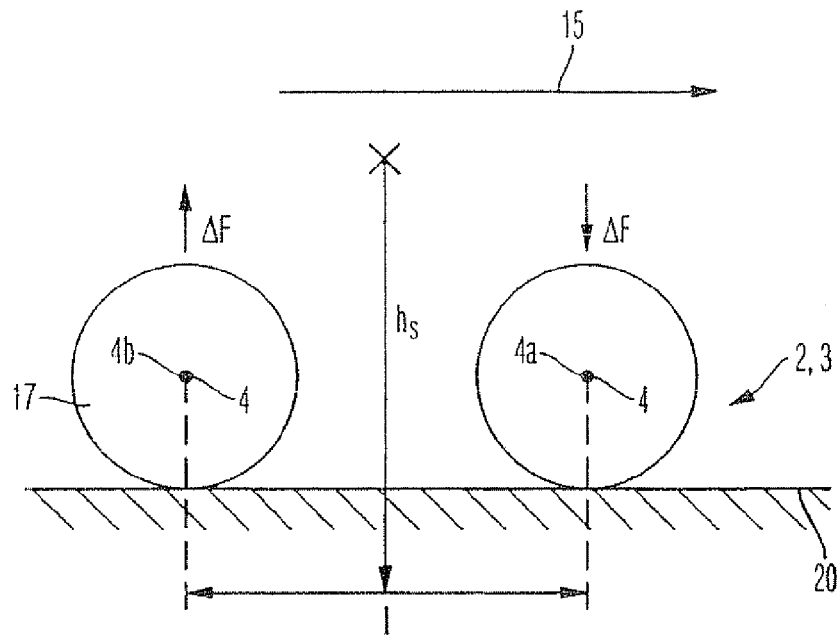
FIG. 3 shows a diagrammatic illustration of the displacement of the axle load which acts in addition to the predetermined braking force.

FIG. 3 shows a diagrammatic illustration of the displacement of the axle load AF which acts in addition to the predetermined braking force. In the event of a braking procedure, in addition to a predetermined braking force $F_{Br}$, there is also displacement of the axle load ΔF. This has the effect that a higher normal force acts on the vehicle axle 4a which is at the front, as seen in the direction of travel, than on the rear vehicle axle 4b, and in accordance with the invention this has the result that the front vehicle axle 4a undergoes a higher resultant braking force. Displacement of the axle load ΔF is calculated from the current deceleration a, by multiplying it with a geometric factor G, with the current deceleration a being determined by calculating the difference between a current linear velocity v of the vehicle and the ground 20 underneath. The geometric factor G of the vehicle 2 is produced from the quotient of a height of the vehicle centre of gravity $h_s$ and the spacing 1 between the axles 4a, 4b.

Figure 4:
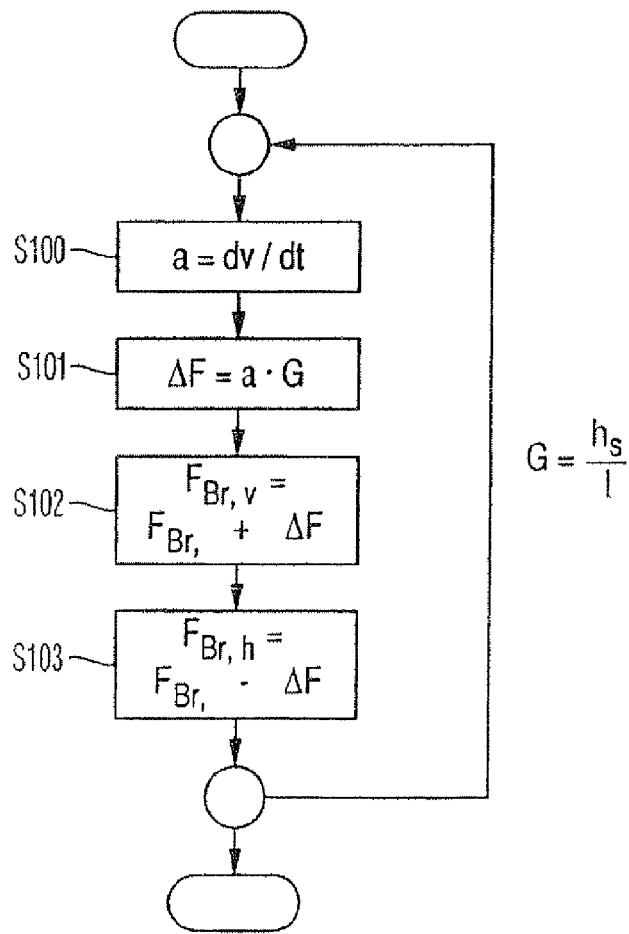
FIG. 4 shows a diagrammatic illustration of the algorithm for calculating a deceleration-dependent distribution of braking force.

FIG. 4 shows a diagrammatic illustration of the algorithm for calculating a deceleration-dependent distribution of braking force $F_{Br,v}$, $F_{Br,h}$. The method according to the invention for controlled braking of a vehicle 2 having a hydrostatic drive mechanism 3 has the effect that regulation of the regulating circuit 7 of the hydraulic motors 6 prevents wheels 17 from locking, in that the regulation continuously determines, for each axle 4a, 4b of the drive mechanism, a respective reference variable F comprising the difference between a set value and the actual value of a speed of the driven wheel 17, and feeds the regulating variable R, which is determined from the reference variable F, back to the respective regulating circuit 7. In order to provide deceleration-dependent distribution of the braking force $F_{Br,v}$, $F_{Br,h}$ to the respective axle 4a, 4b and to the respective wheel 17 by the regulating device 17, the effect sketched in FIG. 3 is utilised. Here, displacement of the axle load ΔF of the vehicle is dynamically determined from the current deceleration a of the vehicle 2, and a resultant braking force $F_{Br,v}$, $F_{Br,h}$ on the axle 4a, 4b driven by the hydraulic motor 6 is determined. The resultant braking force $F_{Br,v}$, $F_{Br,h}$ is put into effect by way of the hydraulic motor 6 associated with the respective axle 4a, 4b by adjusting the respective pivot angle.

The flow chart illustrated in FIG. 4 indicates the individual steps in dynamically determining the resultant braking force $F_{Br,v}$, $F_{Br,h}$.

In step S100, the current deceleration a of the braking procedure is determined from the difference between the current linear velocity v of the vehicle 2 and the ground 20 underneath.

In step S101, displacement of the axle load AF of the vehicle 2 is calculated from the current deceleration a of the braking procedure by multiplying it with the geometric factor G of the vehicle 2.

In step S102, the resultant braking force $F_{Br,v}$ on the axle 4a which is at the front, as seen in the direction of travel 15, is calculated by adding a predetermined braking force $F_{Br}$ to the displacement of the axle load ΔF, with the hydraulic motor or motors 6 of the front axle 4a being adjusted accordingly to give a larger intake volume S.

In step S103, the resultant braking force $F_{Br,h}$ on the rear axle 4b is calculated by subtracting the displacement of the axle load ΔF from the predetermined braking force $F_{Br}$, with the hydraulic motor or motors 6 of the rear axle 4b being adjusted accordingly to give a smaller intake volume.

In the method according to the invention, an adjustment to the hydraulic motor 6 driven by the hydraulic pump 5, resulting from the regulation, is determined by overlaying the currently determined regulating variable R with a changeable control variable S which is externally predetermined by means of the control unit 16. Furthermore, the pivot angles of the hydraulic motors 6 arranged on the axle 4a which is at the front, as seen in the direction of travel, are adjusted to be larger than the pivot angles of the hydraulic motors 6 arranged at the rear.

A further exemplary embodiment of the present invention takes as its starting point the fact that the dynamically determined displacement of the axle load ΔF acts on a driven wheel 17 of the vehicle 2 at its axle 4a which is at the front, as seen in the direction of travel, in addition to an externally predetermined braking force $F_{Br}$, with the result that the dynamically determined displacement of the axle load ΔF acts on each wheel, which results in an additional increase of the effect to intensify the braking force. The resultant braking force $F_{Br,h}$ is produced at a wheel 17 located on the rear axle 4b by subtracting the displacement of the axle load ΔF from the predetermined braking force $F_{Br}$, with this subtraction being carried out for each wheel 17 of the rear axle 4b.

Moreover, the method according to the invention relates to the fact that a further regulating circuit is formed by the hydraulic pump 5, the control unit 16 and the regulating device 7a, and a conveying volume of the hydraulic pump 5 is regulated in that the addition of the externally predetermined control variable S to the determined reference variables F of all the hydraulic motors 6 brings about a change in the conveying volume of the hydraulic pump 5, the conveying volume of the hydraulic pump 5 being reduced such that total throughput of all the hydraulic motors 6 is reduced.

The invention is not restricted to vehicles having hydrostatic drive mechanisms and two vehicle axles, but may also be applied for example to vehicles having more than two vehicle axles.

The invention claimed is:

1. A method for controlled braking of a vehicle having a hydrostatic drive mechanism, the hydrostatic drive mechanism having at least two pivotal hydraulic motors which are connected to a respective axle of the drive mechanism and are driven by a hydraulic pump and regulated by a respective regulating circuit, with regulation of the regulating circuit of the hydraulic motors preventing wheels from locking, the method comprising:

continuously determining, for each axle of the drive mechanism, a respective reference variable (F) comprising the difference between a set value and the actual value of a speed of the driven wheel, feeding said reference variable (F) back to the respective regulating circuit, dynamically determining a displacement of the axle load (ΔF) of the vehicle from a current deceleration (a) of the vehicle, wherein the current deceleration (a) is determined by determining the difference between a current linear velocity (v) of the vehicle and the ground underneath, determining a resultant braking force ($F_{Br,v}$, $F_{Br,h}$) acting on the axle driven by the hydraulic motor being determined and putting the resultant braking force ($F_{Br,v}$, $F_{Br,h}$) into effect by way of the hydraulic motor associated with the respective axle by adjusting a corresponding pivot angle, and providing deceleration-dependent distribution of the braking force ($F_{Br,v}$, $F_{Br,h}$) to the respective axle by a control program.

2. The method according to claim 1, wherein the conveying volume of the hydraulic pump is reduced in that total throughput of all the hydraulic motors is reduced.

3. The method according to claim 1, wherein the current deceleration (a) is multiplied by a geometric factor (G) to calculate the displacement of the axle load (ΔF) of the vehicle.

4. The method according to claim 3, wherein the geometric factor (G) of the vehicle is calculated from the relationship between the height of the vehicle centre of gravity ($h_s$) and the spacing between the axles.

5. The method according to claim 3, wherein the braking force ($F_{Br,v}$) to the axle which is at the front, as seen in the direction of travel, is produced by adding a predetermined braking force ($F_{Br}$) to the displacement of the axle load (ΔF), with the hydraulic motor or motors of the front axle being adjusted accordingly to give a larger intake volume.

6. The method according to claim 3, wherein the braking force ($F_{BR,h}$) to the rear axle is produced by subtracting the displacement of the axle load (ΔF) from the predetermined braking force ($F_{Br}$), with the hydraulic motor or motors of the rear axle being adjusted accordingly to give a smaller intake volume.

7. A method for controlled braking of a vehicle having a hydrostatic drive mechanism, the hydrostatic drive mechanism having at least two pivotal hydraulic motors which are connected to a respective axle of the drive mechanism and are driven by a hydraulic pump and regulated by a respective regulating circuit, with regulation of the regulating circuit of the hydraulic motors preventing wheels from locking, the method comprising:

continuously determining, for each axle of the drive mechanism, a respective reference variable (F) comprising the difference between a set value and the actual value of a speed of the driven wheel, feeding said reference variable (F) back to the respective regulating circuit, dynamically determining a displacement of the axle load (ΔF) of the vehicle from a current deceleration (a) of the vehicle, determining a resultant braking force ($F_{Br,v}$, $F_{Br,h}$) acting on the axle driven by the hydraulic motor being determined and putting the resultant braking force ($F_{Br,v}$, $F_{Br,h}$) into effect by way of the hydraulic motor associated with the respective axle by adjusting a corresponding pivot angle, and providing deceleration-dependent distribution of the braking force ($F_{Br,v}$, $F_{Br,h}$) to the respective axle by a control program;

wherein an adjustment to each hydraulic motor, resulting from the regulation, is determined by overlaying the currently determined reference variable (F) with a changeable control variable (S) which is externally predetermined by means of a control unit.

8. The method according to claim 7, wherein the pivot angles of the hydraulic motors arranged on the axle which is at the front, as seen in the direction of travel, are adjusted to be larger than the pivot angles of the hydraulic motors arranged on the rear axle.

9. The method according to claim 7, wherein the dynamically determined displacement of the axle load (ΔF) acts on a driven wheel of the vehicle at its axle (4a) which is at the front, as seen in the direction of travel, in addition to an externally predetermined braking force ($F_{Br}$).

10. The method according to claim 7, wherein the dynamically determined displacement of the axle load (ΔF) is subtracted from the externally predetermined braking force ($F_{Br}$) for each wheel at a driven wheel of the vehicle at its rear axle.

11. The method according to claim 7, wherein a further regulating circuit is formed by the hydraulic pump, the control unit and the regulator, and a conveying volume of the hydraulic pump is regulated in that the addition of the externally predetermined control variable (S) to the determined reference variables (F) of all the hydraulic motors brings about a change in the conveying volume of the hydraulic pump.

12. The method according to claim 7, wherein the conveying volume of the hydraulic pump is reduced in that total throughput of all the hydraulic motors is reduced.

13. A device for controlled braking of a vehicle having a hydrostatic drive mechanism, the hydrostatic drive mechanism having at least two pivotal hydraulic motors which are connected to a respective axle of the drive mechanism and are driven by a hydraulic pump, the device comprising:
   a regulating device being configured to:
      continuously feed back to the regulating device a reference variable (F) comprising the difference between a set value and the actual value of a speed of the driven wheel,
      dynamically determine the displacement of the axle load ($\Delta F$) of the vehicle from a current deceleration (a) of the vehicle, wherein the current deceleration (a) is determined by determining the difference between a current linear velocity (v) of the vehicle and the ground underneath,
      determine a resultant braking force ($F_{Br,v}$, $F_{Br,h}$) acting on the axle driven by the hydraulic motor, and
      put the resultant braking force into effect by way of the hydraulic motor associated with the respective axle by adjusting a corresponding pivot angle; and
   an anti-lock system being configured to provide a distribution of the braking force ($F_{Br,v}$, $F_{Br,h}$) to the axles of the drive mechanism.

14. The device according to claim 13, wherein the hydrostatic drive mechanism has a closed hydraulic circuit.

15. The device according to claim 13, wherein the hydraulic motors are pivotal to zero.

16. The device according to claim 13, wherein the hydraulic motors and the hydraulic pump each have an actuator activated in a manner which is proportional to the current.

* * * * *